United States Patent
Zhang et al.

(10) Patent No.: US 8,938,123 B2
(45) Date of Patent: Jan. 20, 2015

(54) ELECTRONIC DEVICE AND HANDWRITTEN DOCUMENT SEARCH METHOD

(75) Inventors: Qi Zhang, Nishitama-gun (JP); Rumiko Hashiba, Kawasaki (JP); Hideki Tsutsui, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 134 days.

(21) Appl. No.: 13/601,009

(22) Filed: Aug. 31, 2012

(65) Prior Publication Data

US 2013/0301921 A1    Nov. 14, 2013

(30) Foreign Application Priority Data

May 11, 2012    (JP) .................................. 2012-109833

(51) Int. Cl.
   *G06K 9/00*    (2006.01)
   *G06F 17/00*   (2006.01)

(52) U.S. Cl.
   USPC ............ 382/187; 382/181; 715/251; 715/268

(58) Field of Classification Search
   CPC ......... G06F 3/00; G06F 17/30; G06F 3/0488;
      G06F 3/03545; G06F 17/243; G06K 9/222;
      G06K 9/00422
   USPC ......... 382/100, 137, 181, 187, 115, 119, 242,
      382/232, 189, 241, 155, 156, 135, 209, 217,
      382/218; 715/255, 268, 863, 200, 273, 243,
      715/251; 707/E17.001, E17.014, E17.009;
      235/379, 380
   See application file for complete search history.

(56) References Cited

U.S. PATENT DOCUMENTS

| | | | | |
|---|---|---|---|---|
| 5,530,235 A | * | 6/1996 | Stefik et al. | 235/492 |
| 6,373,473 B1 | | 4/2002 | Sakaguchi et al. | |
| 7,450,114 B2 | * | 11/2008 | Anwar | 345/179 |
| 7,730,050 B2 | * | 6/2010 | Iketani et al. | 707/706 |
| 7,747,949 B2 | * | 6/2010 | Incertis Carro | 715/255 |
| 7,929,770 B2 | | 4/2011 | Arai | |
| 8,145,997 B2 | * | 3/2012 | Wakai | 715/268 |

(Continued)

FOREIGN PATENT DOCUMENTS

| | | |
|---|---|---|
| JP | 07-85097 | 3/1995 |
| JP | 09-091424 | 4/1997 |
| JP | 2003-099713 | 4/2003 |

(Continued)

OTHER PUBLICATIONS

Japanese First Office Action for corresponding Japanese Application No. 2012-109833, mailed Jan. 8, 2013, in 5 pages.

(Continued)

*Primary Examiner* — Sheela Chawan

(74) *Attorney, Agent, or Firm* — Knobbe, Martens, Olson & Bear LLP

(57) ABSTRACT

According to one embodiment, a device includes a search module configured to search handwriting information stored in a storage medium for a first handwriting information part whose degree of a similarity with a specific handwriting information part specified as a search key is greater than or equal to a reference value, the handwriting information includes a plurality of stroke data corresponding to a plurality of strokes, and a display processing module configured to display, on a touchscreen display, one or more thumbnail corresponding to handwriting information includes the first handwriting information part and a first user interface for changing the reference value.

18 Claims, 13 Drawing Sheets

(56) References Cited

U.S. PATENT DOCUMENTS 8,584,043 B2 * 11/2013 Cho et al. ................ 715/838
8,615,721 B2 * 12/2013 Hara ........................ 715/838

FOREIGN PATENT DOCUMENTS

| JP | 2005-216139 | 8/2005 |
| JP | 2005-250674 | 9/2005 |
| JP | 2007-317022 | 12/2007 |
| JP | 2008-003740 | 1/2008 |
| JP | 2010-154089 | 7/2010 |
| JP | 2012-038225 | 2/2012 |

OTHER PUBLICATIONS

Action-Decision of Rejection for corresponding Japanese Application No. 2012-109833, mailed Apr. 23, 2013, in 4 pages.

* cited by examiner

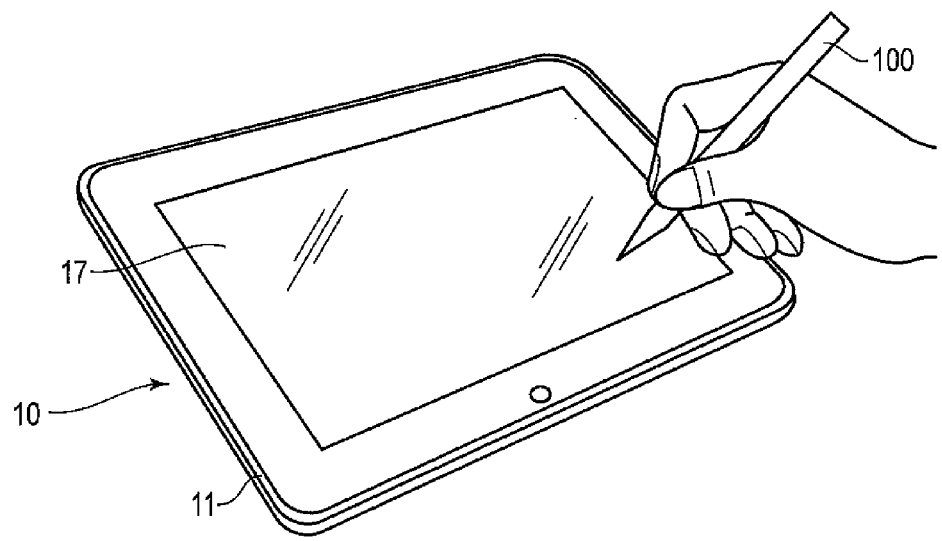
F I G. 1
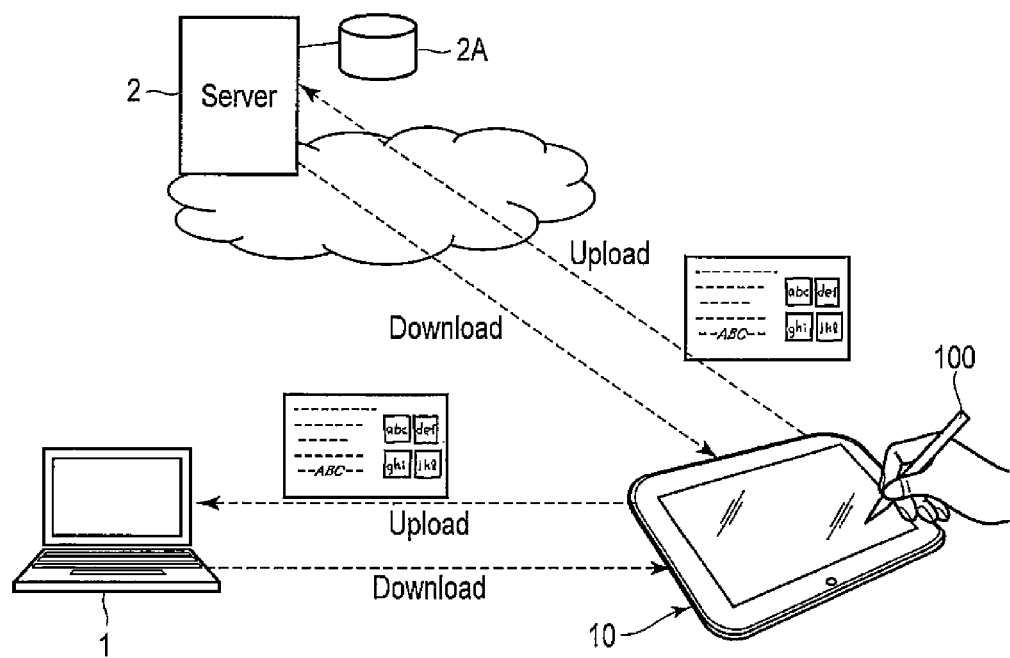
F I G. 2

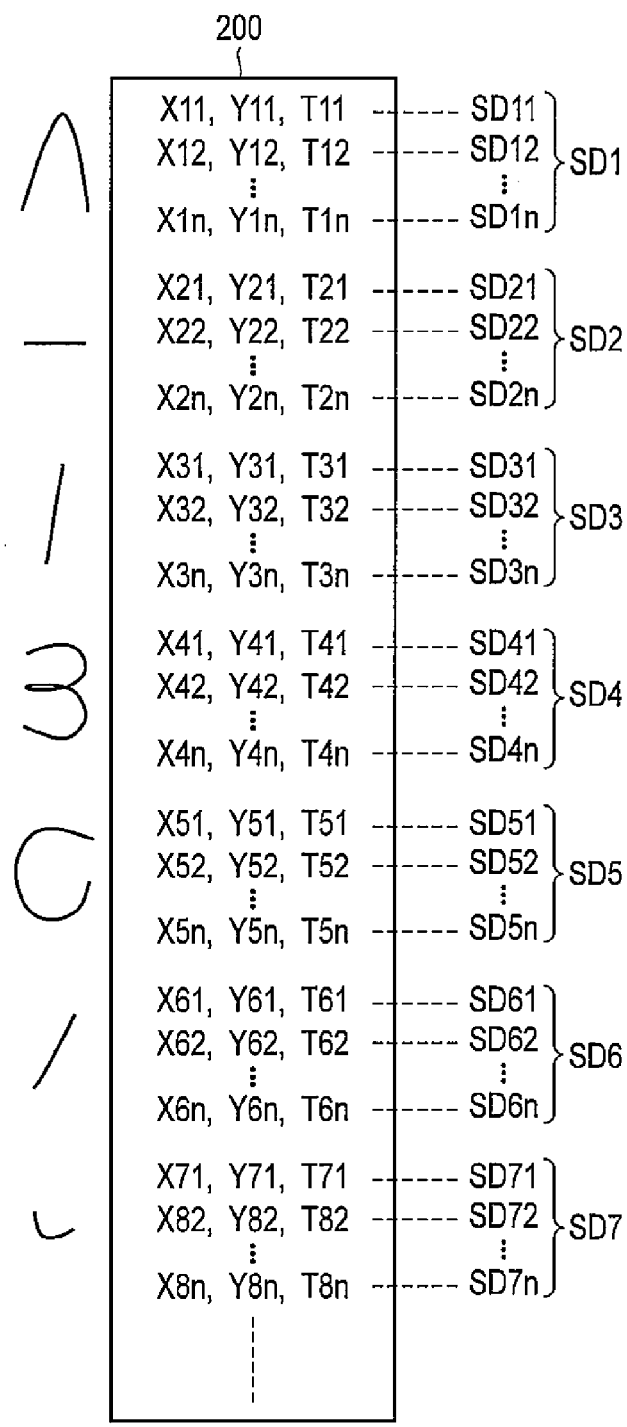
F I G. 4

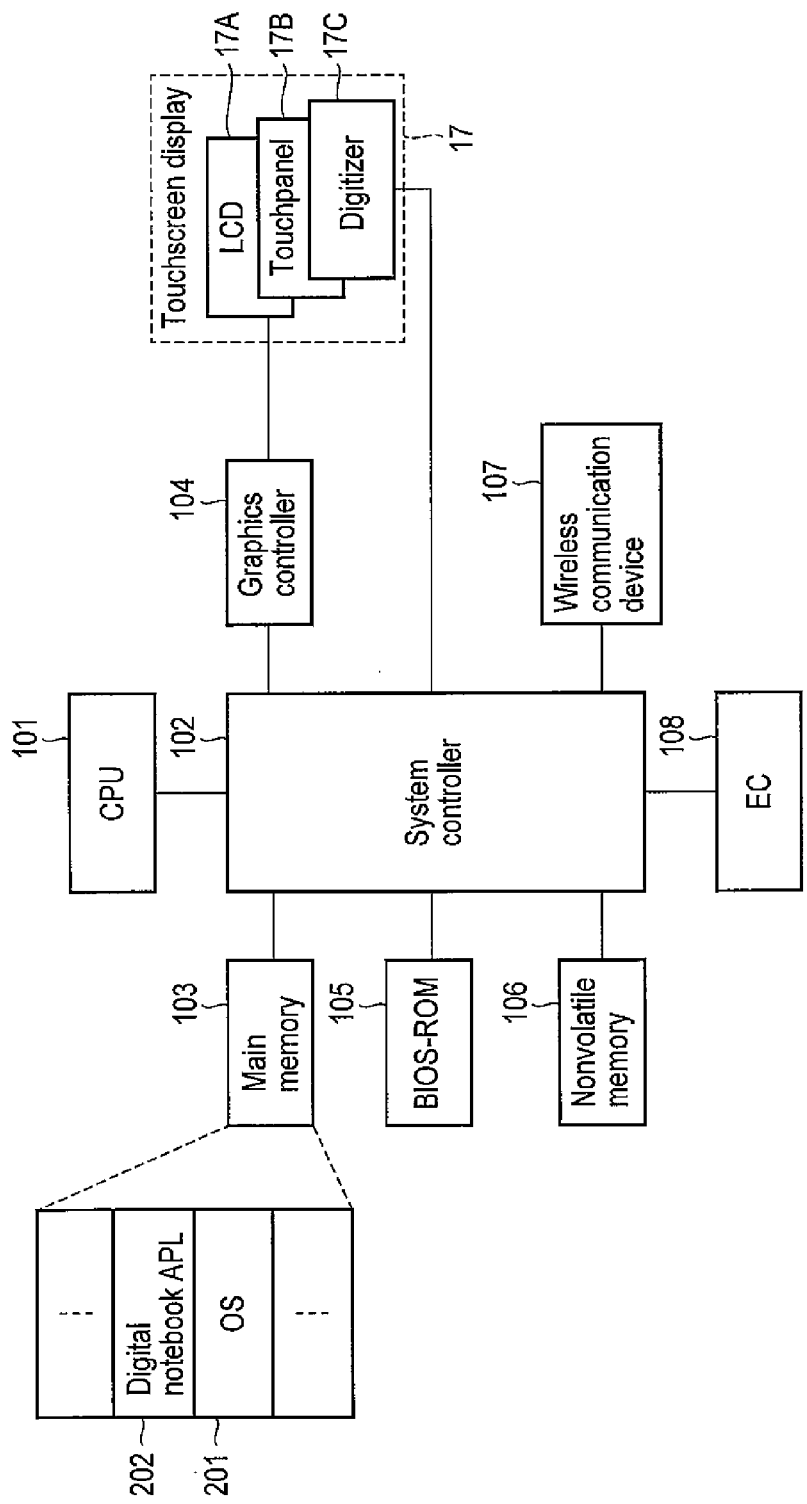
F I G. 5

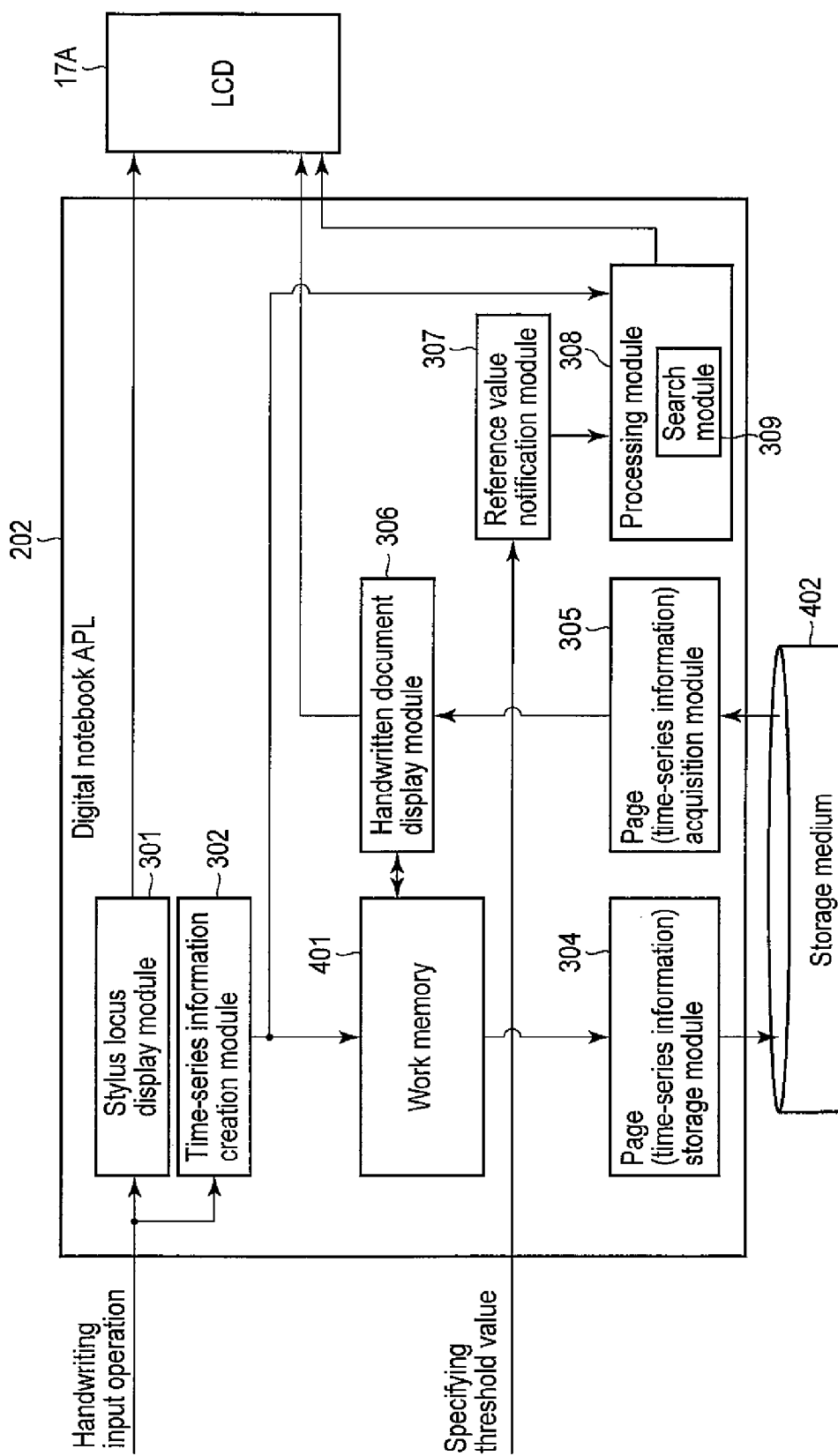
F I G. 6

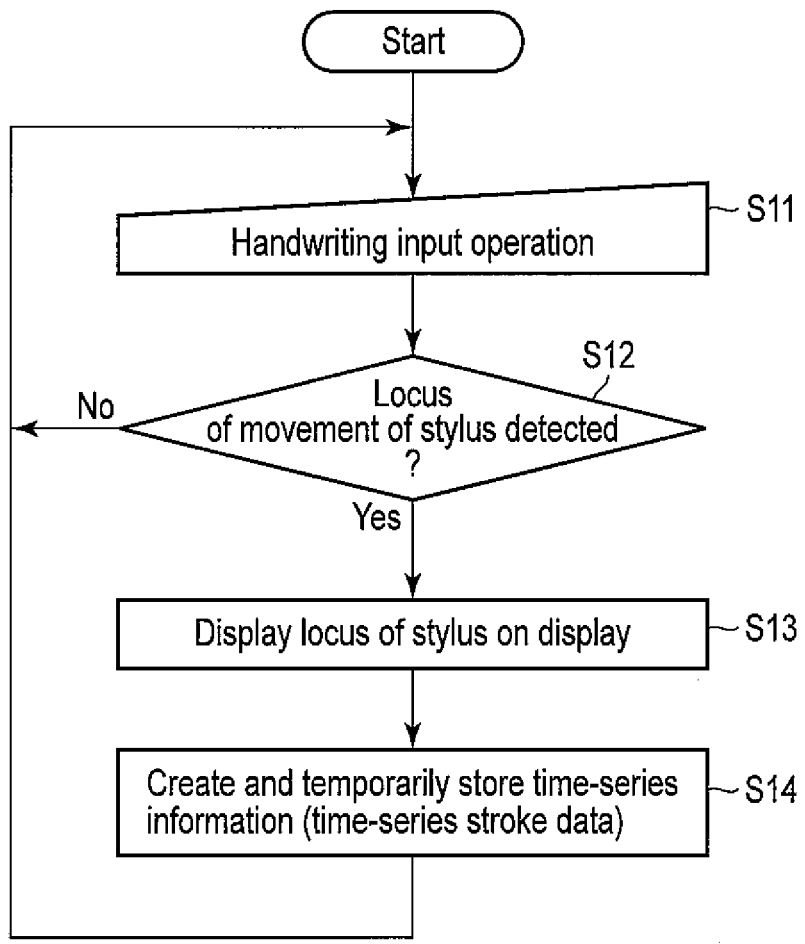
F I G. 7

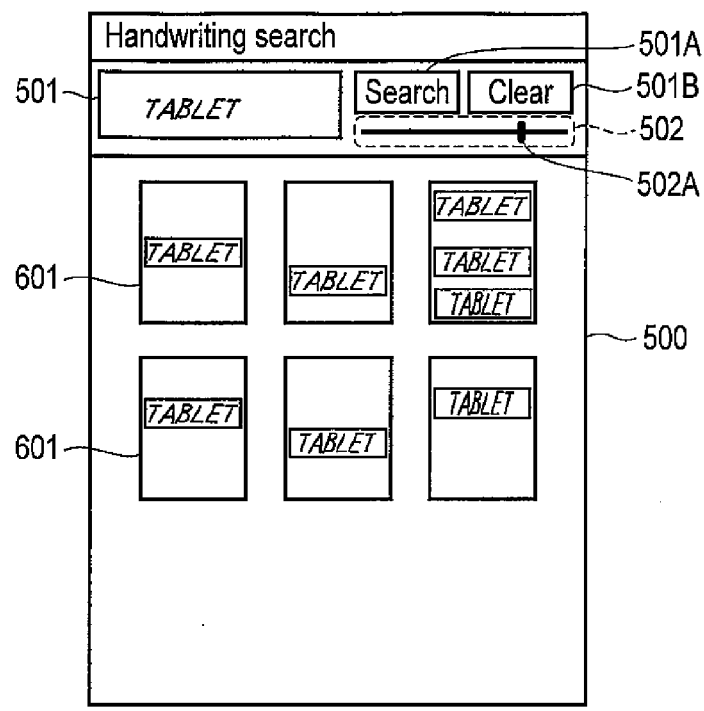
F I G. 10
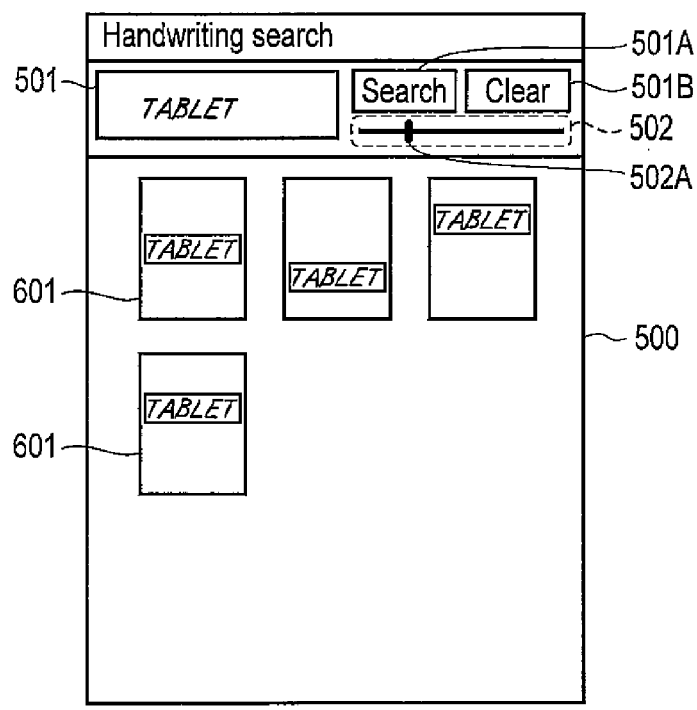
F I G. 11

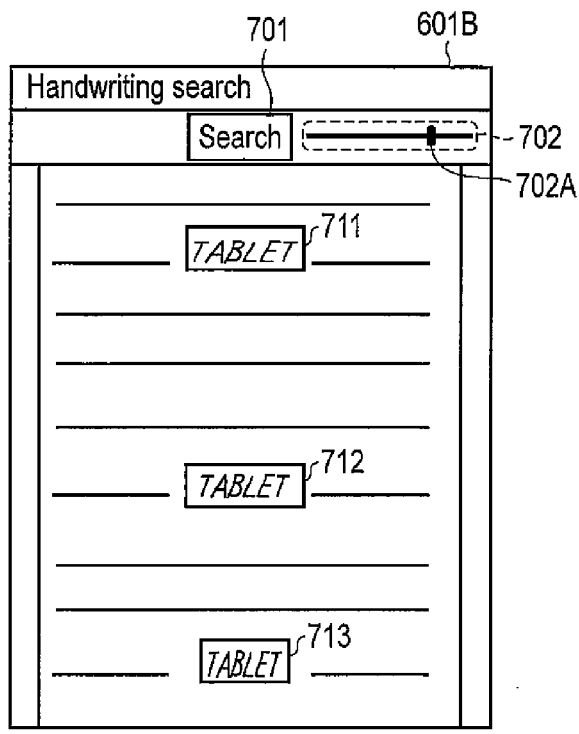
F I G. 1 3
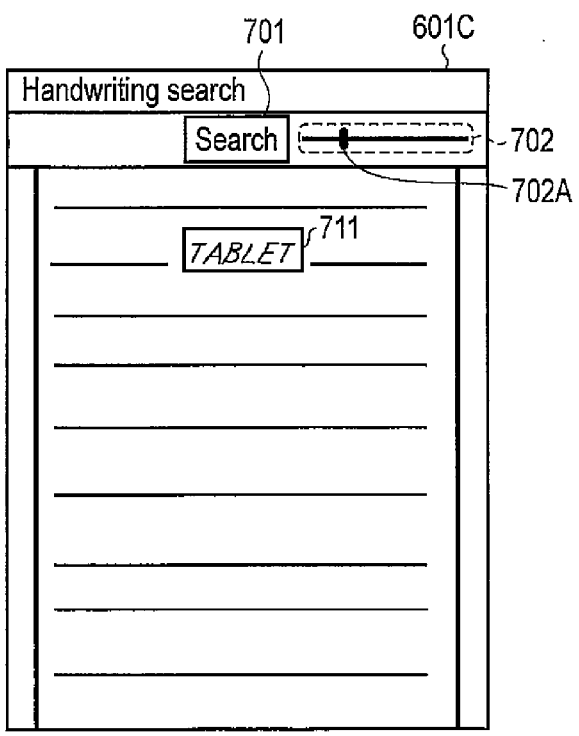
F I G. 1 4

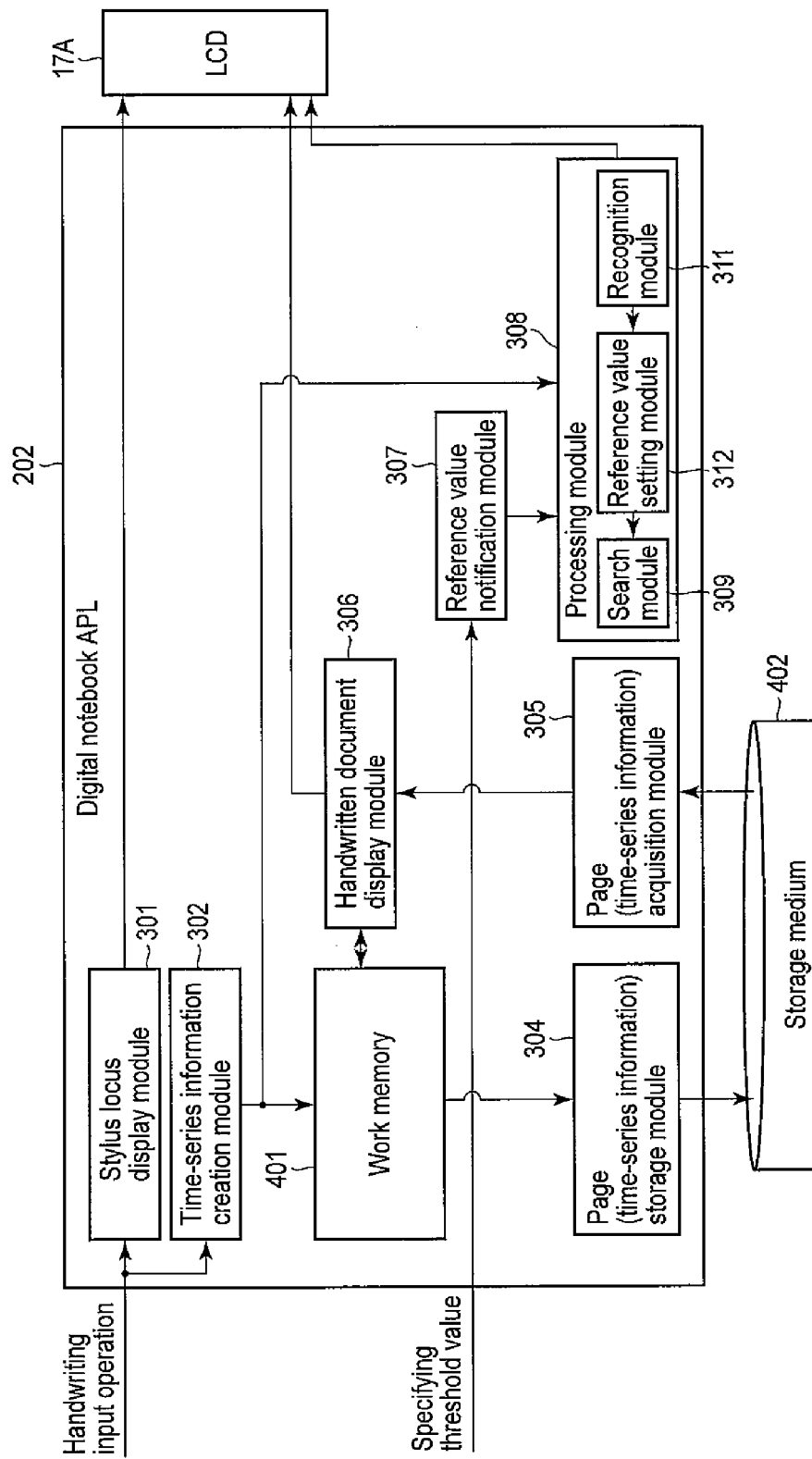
F I G. 17

ELECTRONIC DEVICE AND HANDWRITTEN DOCUMENT SEARCH METHOD

CROSS-REFERENCE TO RELATED APPLICATIONS

This application is based upon and claims the benefit of priority from Japanese Patent Application No. 2012-109833, filed May 11, 2012, the entire contents of which are incorporated herein by reference.

FIELD

Embodiments described herein relate generally to an electronic device capable of searching for handwriting in a handwritten document and a handwritten document search method used in the electronic device.

BACKGROUND

In recent years, various electronic devices, including a tablet, a PDA, and a smartphone, have been developed. Most of the electronic devices of this type include a touchscreen display to facilitate a user input operation.

The user touches a menu or an object displayed on a touchscreen display with a finger or the like, thereby making it possible to instruct a portable electronic device to execute a function related to the menu or object.

However, many of the existing electronic devices with a touchscreen display are consumer products contributing to the operability of image data, music data, and other media data and therefore may not be necessarily suitable for use in business situations, including conferences, business meetings, and product development. Accordingly, paper notebooks have been still widely used in business situations.

A method has been considered which stores handwriting information including a plurality of stroke data items corresponding to a plurality of strokes, respectively, handwritten on a touchscreen display in place of a paper notebook.

In addition, a handwriting search process has been proposed which searches the stored handwriting information for a handwriting information part that has a locus of a stroke whose degree of the similarity with a locus of a stroke corresponding to a specific handwriting information part specified as a search key is greater than or equal to a reference value.

However, in the handwriting search process, an intended handwriting information part was sometimes not searched for, or an unintended handwriting information part was occasionally searched for.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view showing an outer appearance of an electronic device according to an embodiment.

FIG. 2 is an exemplary diagram showing the cooperation between the electronic device of the embodiment and an external device.

FIG. 4 is an exemplary drawing to explain time-series information of the embodiment.

FIG. 5 is an exemplary block diagram showing a system configuration of the electronic device of the embodiment.

FIG. 6 is an exemplary block diagram showing a functional configuration of a digital notebook application program of the embodiment.

FIG. 7 is an exemplary flowchart to explain the procedure for a handwritten document creation process of the embodiment.

FIG. 10 is an exemplary diagram showing a search result.

FIG. 11 is an exemplary diagram showing a search result.

FIG. 13 is an exemplary diagram showing the way a reference value has been changed in the state of FIG. 12.

FIG. 14 is an exemplary diagram showing the way a reference value has been changed in the state of FIG. 12.

FIG. 17 is an exemplary diagram showing a modification of the functional configuration of the digital notebook application program 202.

DETAILED DESCRIPTION

Figure 3:
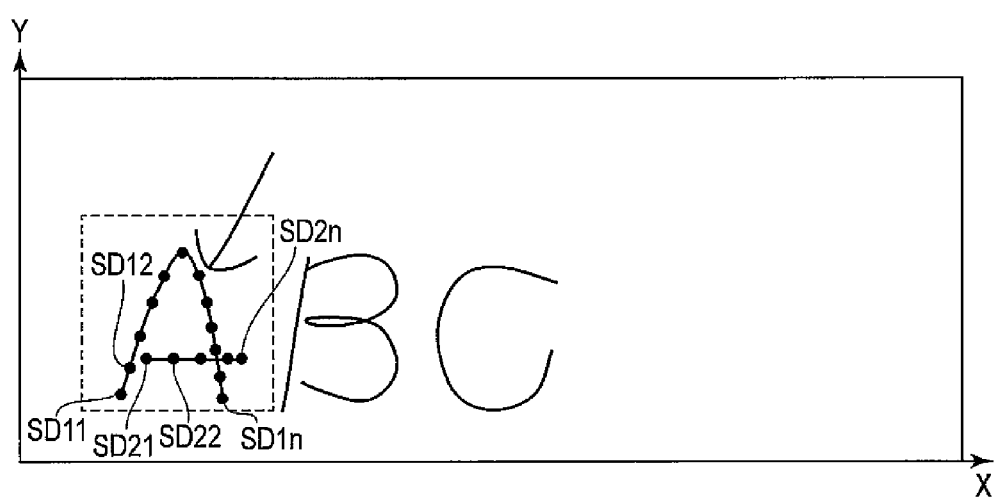
FIG. 3 is an exemplary diagram showing a document handwritten on a touchscreen display of the electronic device of the embodiment.

Various embodiments will be described hereinafter with reference to the accompanying drawings.

In general, according to one embodiment, an electronic device comprises a touchscreen display, a search module, and a display processing module. The search module is configured to search handwriting information stored in a storage medium for a first handwriting information part whose degree of a similarity with a specific handwriting information part specified as a search key is greater than or equal to a reference value. The handwriting information comprises a plurality of stroke data corresponding to a plurality of strokes. The display processing module is configured to display, on the touchscreen display, one or more thumbnails corresponding to handwriting information comprising the first handwriting information part and a first user interface for changing the reference value.

FIG. 1 is a perspective view showing an outer appearance of an electronic device according to an embodiment. The electronic device is, for example, a stylus-based portable electronic device capable of handwriting input with a stylus or a finger. The electronic device can be realized in the form of a tablet computer, a notebook personal computer, a smartphone, a PDA, or the like. Hereinafter, an explanation will be given on the assumption that the electronic device is realized in the form of a tablet computer 10. The tablet computer 10, which is a portable electronic device called a tablet or a straight computer, comprises a body 11 and a touchscreen display 17. The touchscreen display 17 is mounted on the body 11 so as to be laid on the upper surface of the body 11.

The body 11 is a thin box-like chassis. In the touchscreen display 17, a flat-panel display and a sensor configured to sense the contact position of a stylus or a finger on the screen of the flat-panel display are incorporated. The flat-panel display may be, for example, a liquid-crystal display (LCD). As the sensor, for example, a capacitance-type touchpanel or an electromagnetic-induction-type digitizer may be used. Hereinafter, it is assumed that two types of sensors, a digitizer and a touchpanel, have been incorporated in the touchscreen display 17.

Each of the digitizer and touchpanel is provided so as to cover the screen of the flat-panel display. The touchscreen display 17 can sense not only a touch operation on the screen with a finger but also a touch operation on the screen with a stylus 100. The stylus 100 may be, for example, an electromagnetic induction stylus. The user can perform handwriting input operation on the touchscreen display 17 using an external object (a stylus 100 or a finger). In a handwriting input operation, a locus of the movement of an external object (a stylus 100 or a finger) on the screen, that is, a locus (handwriting) of a stroke handwritten in a handwriting input operation is drawn in real time, with the result that a locus of each stroke is displayed on the screen. A locus of the movement of an external object during the time when the external object is in touch with the screen corresponds to one stroke. A set of strokes corresponding to handwritten characters or figures, that is, a set of many loci (handwriting), constitutes a handwritten document.

In the embodiment, this handwritten document is stored in a storage medium in the form of a coordinate sequence of loci of individual strokes and time-series information representing the order relation between strokes, not in the form of image data. The time-series information will be explained in detail later with reference to FIG. 4. The time-series information generally means a set of time-series stroke data items corresponding to individual strokes. Each stroke data item corresponds to a stroke and includes a coordinate data series (time-series coordinates) corresponding to individual points on a locus of the stroke. The sequence of the stroke data items corresponds to the order in which the individual strokes have been handwritten, that is, the stroke order.

The tablet computer 10 can read an arbitrary piece of existing time-series information from a storage medium and display a handwritten document corresponding to the time-series information, that is, loci corresponding to a plurality of strokes shown by the time-series information respectively, on the screen. The tablet computer 10 further has an edit function. The edit function can delete or move an arbitrary stroke, an arbitrary handwritten character, or the like in a currently displayed handwritten document according to an edit operation by the user using an "eraser" tool, a range specify tool, and other various tools. The edit function also includes the function of canceling a history of several handwriting operations.

In the embodiment, time-series information (handwritten document) can be managed as one or a plurality of pages. In this case, time-series information (handwritten document) may be delimited in units of an area that fits in a screen, enabling a set of pieces of time-series information fitting in a screen to be recorded as a page. Alternatively, the size of a page may be made variable. In this case, the size of a page can be made larger than the size of one screen and therefore a handwritten document whose area is larger than the size of the screen can be treated as a page. When the whole of a page cannot be shown on a display, the page may be reduced. Alternatively, a displayed part of the page may be moved by scrolling the page vertically or horizontally.

FIG. 2 shows the cooperation between the tablet computer 10 and an external device. The tablet computer 10 can cooperate with a personal computer 1 or a cloud. Specifically, the tablet computer 10, which includes a wireless communication device, such as a wireless LAN, can perform wireless communication with the personal computer 1. In addition, the tablet computer 10 also can communicate with a server 2 on the Internet. The server 2 may be a server that provides on-line storage services or other various cloud computing services.

The personal computer 1 includes a storage device, such as a hard disk drive (HOD). The tablet computer 10 can transmit time-series information (handwritten document) to the personal computer 1 via a network and record the time-series information in the HDD of the personal computer 1 (in an upload operation). To assure secure communication between the tablet computer 10 and personal computer 1, the personal computer 1 may authenticate the tablet computer 10 at the start of communication. In this case, a dialog that prompts the user to input an ID or a password may be displayed on the screen of the tablet computer 10. Alternatively, the ID of the tablet computer 10 or the like may be transmitted automatically from the tablet computer 10 to the personal computer 1.

This enables the tablet computer 10 to handle a large number of pieces of time-series information (handwritten document) or a large amount of time-series information (handwritten document) even when the capacity of the storage in the tablet computer 10 is low.

In addition, the tablet computer 10 can read (or download) arbitrary one or more pieces of time-series information recorded on the HDD of the personal computer 1 and display a locus of each stroke shown by the read time-series information on the screen of the display 17 of the tablet computer 10. In this case, a list of thumbnails obtained by reducing each page of a plurality of pieces of time-series information (handwritten document) may be displayed on the screen of the display 17. Alternatively, one page selected from the thumbnails may be displayed in a normal size on the screen of the display 17.

A thumbnail may take any form, provided that it is a display screen (image) corresponding to a piece of time-series information (handwritten document). A thumbnail may be such that a piece of time-series information (handwritten document) is enlarged or reduced arbitrarily or processed into a form easy to see according to magnification.

Furthermore, a destination with which the tablet computer 10 communicates may be the server 2 on a cloud that provides storage services, not the personal computer 1. The tablet computer 10 can transmit time-series information (handwritten document) to the server 2 via a network and record (upload) the time-series information in a storage device 2A of the server 2. Moreover, the tablet computer 10 can read (download) an arbitrary piece of time-series information recorded in the storage device 2A of the server 2 and display a locus of each stroke shown by each piece of time-series information at that time on the display 17 of the tablet computer 10.

As described above, in the embodiment, the storage medium in which time-series information is stored may be any one of the storage device in the tablet computer 10, the storage device in the personal computer 1, and the storage device of the server 2.

Next, the relationship between strokes (characters, marks, or figures) handwritten by the user and time-series information will be explained with reference to FIGS. 3 and 4. FIG. 3 shows an example of a handwritten document (or handwritten character string) handwritten on the touchscreen display 17 with a stylus 100 or the like.

In a handwritten document, another character or figure is often handwritten over an already handwritten character or figure. In FIG. 3, it is assumed that a handwritten character string "ABC" is handwritten in this order: "A", "B", "C". Thereafter, a handwritten arrow is assumed to be handwritten very close to the handwritten letter "A".

The handwritten letter "A" is represented by two strokes (a locus of a "^" shape and a locus of a "-" shape) handwritten with the stylus 100 or the like, that is, by two loci. The locus of a "^" shape handwritten first with the stylus 100 is sampled in real time at equal intervals of time, producing time-series coordinates SD11, SD12, . . . , SD1n of a "^" shaped stroke. Similarly, the locus of a-shape handwritten next with the stylus 100 is also sampled, producing time-series coordinates SD21, SD22, . . . , SD2n of a "-" shaped stroke.

The handwritten letter "B" is represented by two strokes handwritten with the stylus 100 or the like, that is, by two loci. The handwritten letter "C" is represented by one stroke handwritten with the stylus 100 or the like, that is, by one locus. A handwritten arrow is represented by two strokes handwritten with the stylus 100 or the like, that is, by two loci.

FIG. 4 shows time-series information 200 corresponding to the handwritten document of FIG. 3. The time-series information includes a plurality of stroke data items SD1, SD2, . . . , SD7. In the time-series information 200, these stroke data items SD1, SD2, . . . , SD7 are arranged in stroke order, that is, chronologically in the order in which a plurality of strokes have been handwritten.

In the time-series information 200, the first two stroke data items SD1, SD2 represent the two strokes of the handwritten letter "A" respectively. A third and a fourth stroke data item SD3, SD4 represent the two strokes constituting the handwritten letter "B" respectively. A fifth stroke data item SD5 represents the one stroke constituting the handwritten letter "C". A sixth and a seventh stroke data item SD6, SD7 represent the two strokes constituting the handwritten arrow, respectively.

Each stroke data item includes a coordinate data series (time-series coordinates) corresponding to one stroke, that is, a plurality of coordinates corresponding to a plurality of points on a locus of the stroke, respectively. In each stroke data item, a plurality of coordinates are arranged chronologically in the order in which the stroke has been written. For example, as for the handwritten letter "A", stroke data item SD1 includes a coordinate data series (time-series coordinates) corresponding to the points on a locus of the stroke of a "^" shape in the handwritten letter "^", that is, an n number of coordinate data items SD11, SD12, . . . , SD1n. Stroke data item SD2 includes a coordinate data series corresponding to the points on a locus of the stroke of a-shape in the handwritten letter "A", that is, an n number of coordinate data items SD21, SD22, . . . , SD2n. The number of coordinate data items may differs from stroke data item to another.

Each coordinate data item represents an x-coordinate and a y-coordinate corresponding to a point in the corresponding locus. For example, coordinate data item SD11 represents x-coordinate (X11) and y-coordinate (Y11) of the start point of a "^" shaped stroke. SD1n represents x-coordinate (X1n) and y-coordinate (Y1n) of the end point of the "^" shaped stroke.

In addition, each coordinate data item may include time stamp information T corresponding to a time point that a point corresponding to the coordinates has been handwritten. The time point that the point has been handwritten may be either absolute time (e.g., year, month, day, hours, minutes, seconds) or relative time using a certain time point as a reference. For example, absolute time (e.g., year, month, day, hours, minutes, seconds) that a stroke started to be written may be added as time stamp information to each stroke data item and further relative time representing the difference from absolute time may be added as time stamp information T to each coordinate data item in the stroke data item.

As described above, use of time-series information where time stamp information T has been added to each coordinate data item enables the temporal relationship between strokes to be represented accurately.

In addition, information (Z) indicating stylus pressure may be added to each coordinate data item.

The time-series information 200 with the structure explained in FIG. 4 can represent not only the stylus pressure of each stroke but also the temporal relationship between strokes. Therefore, use of the time-series information 200 enables the handwritten letter "A" and the handwritten tip portion of the arrow to be treated as different letters or figures even if the tip portion of the handwritten arrow has been written so as to overlap with the handwritten letter "A" or be close to the handwritten letter "A" as shown in FIG. 3.

Now, suppose the user has specified a certain range on the screen as shown by a dashed square in FIG. 3. The specified range shown by the dashed square includes the two strokes of the handwritten letter "A" and one stroke corresponding to the tip portion of the handwritten arrow. In normal circumstances, the chances are that not only the two strokes of the handwritten letter "A" but also one stroke corresponding to the tip portion of the handwritten arrow will be selected as a time-series information part to be processed.

In the embodiment, however, use of the time-series information 200 enables the tip portion of the handwritten arrow to be excluded from the time-series information part to be processed. Specifically, in the embodiment, the time-series information 200 is analyzed. As a result of the analysis, it has been determined that the two strokes (stroke data items SD1, SD2) of the handwritten letter "A" have been written continuously. In addition, it has been determined that the timing with which the tip portion (stroke data item SD7) of the handwritten arrow is handwritten is discontinuous with the timing with which the handwritten letter "A" is handwritten. Therefore, the tip portion (stroke data item SD7) of the handwritten arrow can be excluded from the time-series information part to be processed. In this case, whether the timing with which the tip portion (stroke data item SD7) of the handwritten arrow is handwritten is discontinuous with the timing with which the handwritten letter "A" is handwritten can be determined on the basis of the arrangement of stroke data items in the time-series information. Alternatively, this determination can be made using the aforementioned time stamp information T. Use of time stamp information T enables higher-accuracy determination. In addition, the above determination may be made on the basis of both of the arrangement of stroke data items in the time-series information and the time stamp information T. For example, if more than a specific number of stroke data items are included between stroke data item SD2 and stroke data item SD7, it may be determined that the timing with which stroke data item SD7 is written is discontinuous with the timing with which stroke data item SD2 is written. If the number of stroke data items between stroke data item SD2 and stroke data item SD7 is smaller than the specific number, it may be determined whether the timing with which stroke data item SD7 is written is discontinuous with the timing with which stroke data item SD2 is written, on the basis of the time stamp information in stroke data item SD2 and the time stamp information in stroke data item SD7. In this case, time stamp information T2n added to the last coordinate data item in stroke data item SD2 may be compared with time stamp information T71 added to the first coordinate data item in stroke data item SD7.

Furthermore, in the time-series information 200 of the embodiment, the arrangement of stroke data items SD1, SD2, . . . , SD7 represents the stroke order of handwritten letters. For example, the arrangement of stroke data items SD1 and SD2 indicates that a """ shaped stroke has been handwritten and then a "-" shaped stroke has been handwritten. Therefore, even when two handwritten letters are similar to each other in handwriting, if they differ from each other in stroke order, they can be recognized as two different handwritten letters.

Moreover, in the embodiment, since a handwritten document is stored in the form of time-series information 200 composed of a set of time-series stroke data items, not in the form of images or character recognition results, handwritten characters can be handled independently of the language of handwritten characters. Therefore, the structure of the time-series information 200 in the embodiment can be used in the same manner in various countries differing in language around the world.

FIG. 5 shows a system configuration of the tablet computer 10.

As shown in FIG. 5, the tablet computer 10 comprises a CPU 101, a system controller 102, a main memory 103, a graphics controller 104, a BIOS-ROM 105, a nonvolatile memory 106, a wireless communication device 107, and an embedded controller (EC) 108.

The CPU 101 is a processor that controls the operations of various modules in the tablet computer 10. The CPU 101 executes various software programs loaded from the nonvolatile memory 106, a storage device, to the main memory 103. These software programs include an operating system (OS) 201 and various application programs. The application programs include a digital notebook application program 202. The digital notebook application program 202 has the function of creating and displaying a handwritten document, the function of editing a handwritten document, the function of searching for handwriting, the function of recognizing characters and diagrams, and the like.

In addition, the CPU 101 executes a basis input/output system (BIOS) stored in the BIOS-ROM 105. The BIOS is a program for hardware control.

The system controller 102 is a device that connects a local bus of the CPU 101 with various components. The system controller 102 incorporates a memory controller that performs access control of the main memory 103. In addition, the system controller 102 also has the function of communicating with the graphics controller 104 via a serial bus conforming to the PCI EXPRESS standard.

The graphics controller 104 is a display controller that controls an LCD 17A used as a display monitor of the tablet computer 10. A display signal generated by the graphics controller 104 is sent to the LCD 17A. The LCD 17A displays a screen image on the basis of the display signal. On the LCD 17A, a touchpanel 17B and a digitizer 17C are arranged. The touchpanel 17B is a capacitance-type pointing device for inputting on the screen of the LCD 17A. The touchpanel 17B detects the contact position on the screen where a finger touches and the movement of the contact position. The digitizer 17C is an electromagnetic pointing device for inputting on the screen of the LCD 17A. The digitizer 17C detects the contact position on the screen where the stylus 100 touches and the movement of the contact position.

The wireless communication device 107 is a device configured to perform wireless communication, such as a wireless LAN or a 3G mobile communication. The EC 108 is a one-chip microcomputer that includes an embedded controller for power management. The EC 108 has the function of turning on or off the power supply of the tablet computer 10 according to the operation of a power button by the user.

Next, a functional configuration of the digital notebook application program 202 will be explained with reference to FIG. 6.

The digital notebook application program 202 comprises a stylus locus display module 301, a time-series information creation module 302, a page storage module 304, a page acquisition module 305, a handwritten document display module 306, a reference value notification module 307, and a processing module 308.

The digital notebook application program 202 uses stroke data input by use of the touchscreen display 17, thereby creating, displaying, or editing a handwritten document. The touchscreen display 17 is configured to detect the occurrence of an event, such as "touch", "move (slide)", or "release". "Touch" is an event that indicates that an external object has made contact with the screen. "Move (slide)" is an event that indicates that the contact position has been moved while an external object is in contact with the screen. "Release" is an event that indicates that an external object has been separated from the screen.

The stylus locus display module 301 and time-series information creation module 302 receive a "touch" or "move (slide)" event generated by the touchscreen display 17, thereby detecting a handwriting input operation. A "touch" event includes the coordinates of the contact position. A "move (slide)" event also includes the coordinates of the contact position at a move destination. Therefore, the stylus locus display module 301 and time-series information creation module 302 can receive a coordinate string corresponding to the locus of the move of the contact position from the touchscreen display 17.

The stylus locus display module 301 receives a coordinate string from the touchscreen display 17 and displays a locus of each stroke handwritten by a handwriting input operation with the stylus 100 or the like on the basis of the coordinate string on the screen of the LCD 17A of the touchscreen display 17. The stylus locus display module 301 draws, on the screen of the LCD 17A, a locus of the stylus 100 during the time when the stylus 100 is in contact with the screen, that is, a locus of each stroke.

The time-series information creation module 302 receives the coordinate string output from the touchscreen display 17 and creates the time-series information with a structure as described in detail in FIG. 4. In this case, time-series information, that is, coordinates corresponding to the individual points in a stroke and time stamp information, may be stored temporarily in a work memory 401.

The page storage module 304 stores created time-series information in a storage medium 402 in the form of a handwritten document (handwritten pages). As described above, the storage medium 402 may be any one of the storage device of the tablet computer 10, the storage device of the personal computer 1, and the storage device of the server 2.

The page acquisition module 305 reads an arbitrary piece of time-series information already stored from the storage medium 402. The read piece of time-series information is sent to the handwritten document display module 306. The handwritten document display module 306 analyzes time-series information and displays a locus of each stroke shown by time-series information on the screen as a handwritten page on the basis of the analysis result.

The reference value notification module 307 notifies a search module 309 described later of a reference value in a handwriting search process according to an input.

The processing module 308 can subject time-series information to be processed to various processes, for example, to a handwriting search process. The processing module 308 includes a search module 309.

The search module 309 searches a plurality of pieces of time-series information (a plurality of handwritten pages) already stored in the storage medium 402 for a specific time-series information part (specific handwritten letters or the like) in the pieces of time-series information. The search module 309 includes a specification module configured to specify the specific time-series information part as a search key or a search query. The search module 309 searches each of the pieces of time-series information for a time-series information part that has a locus of a stroke whose degree of the similarity with a locus of a stroke corresponding to the specific time-series information part is greater than or equal to a reference value. Then, the search module 309 visibly displays a locus corresponding to the searched time-series information part on the screen of the LCD 17A.

For example, as the specific time-series information part specified as a search query, a specific handwritten character, a specific handwritten character string, a specific handwriting symbol, a specific handwritten figure, and the like can be used. Hereinafter, suppose a case where a specific handwritten character string is specified as a search query.

The search module 309 searches for handwriting in such a manner that the module 309 searches the already recorded handwritten pages for a handwritten character string that has handwriting similar to a specific handwritten character string serving as a search query. In addition, the search module 309 may search only one currently displayed handwritten page for handwriting.

Various methods can be used as a method of calculating the degree of the similarity between handwritten characters. For example, a coordinate string of each stroke may be treated as a vector. In this case, to calculate the degree of the similarity between vectors to be compared with each other, the inner product of vectors to be compared with each other may be used as the degree of the similarity between vectors to be compared with each other. As another example, a locus of each stroke may be treated as an image and the magnitude of the area of a part where images of loci to be compared with each other overlap with each other becomes the largest may be used as the degree of similarity. A device to reduce the amount of calculation may be thought out. In addition, dynamic programming matching may be used as a method of calculating the degree of the similarity between handwritten characters.

The specification module of the search module 309 may display, on the screen, a character string to be searched for or a search key input area for handwriting a figure. A character string or the like handwritten by the user in the search key input area is used as a search query.

For example, the user can specify a range by enclosing a part of a currently displayed page with a handwritten circle. Alternatively, the user may set the digital notebook application program 202 in a "select" mode using a prepared menu and then trace a part of a currently displayed page with the stylus 100.

As described above, when a time-series information part to handwritten character string) in the currently displayed time-series information (handwritten page) has been selected as a search query, the search module 309 excludes the time-series information part selected as a search query from search objects. Specifically, the search module 309 searches the currently displayed time-series information excluding the selected time-series information part, not the whole of the currently displayed time-series information, for a time-series information part that has a locus of a stroke whose degree of the similarity with a locus of a stroke corresponding to the selected time-series information part is greater than or equal to a reference value.

As described above, excluding the time-series information part selected as a search query from search objects prevents the selected time-series information part (the character string to be searched for) itself from being displayed as the search result.

Therefore, the user can input a search query by handwriting a new character string to be used as a search query on a currently displayed page and selecting the character string. In this case, since the newly handwritten character string (search query) itself is excluded from search objects, the newly handwritten character string itself is not displayed as a search result. Therefore, it is possible to easily use a part of the currently displayed handwritten page as a search query without displaying the search key input area on the screen.

As described above, with the embodiment, it is possible to search a plurality of handwritten pages already written for a handwritten character similar to a feature of a handwritten character selected as a search query. Therefore, a handwritten page meeting the user's intention can be retrieved easily from a large number of handwritten pages created and stored in the past.

Unlike test search, handwriting search of the embodiment does not require character recognition. Since the handwriting search is independent of language, a handwritten page in any language can be searched for. In addition, a figure or the like can be used as a search query for handwriting search. Moreover, a symbol, a mark, or the like other than language can be used as a search query for handwriting search.

Next, the procedure for a handwritten page creation process performed by the digital notebook application program 202 will be explained with reference to a flowchart in FIG. 7.

When the user performs a handwriting input operation with the stylus 100 (block S11), a "touch" or a "move" event is generated. On the basis of these events, the digital notebook application program 202 detects a locus of the movement of the stylus 100 (block S12). If a locus of the movement of the stylus 100 has been detected (Yes in block S12), the digital notebook application program 202 displays the detected locus of the movement of the stylus 100 (block S13). In addition, the digital notebook application program 202 creates time-series information on the basis of a coordinate string corresponding to the detected locus of the movement of the stylus 100 and stores the time-series information in the work memory 401 temporarily (block S14).

Figure 8:
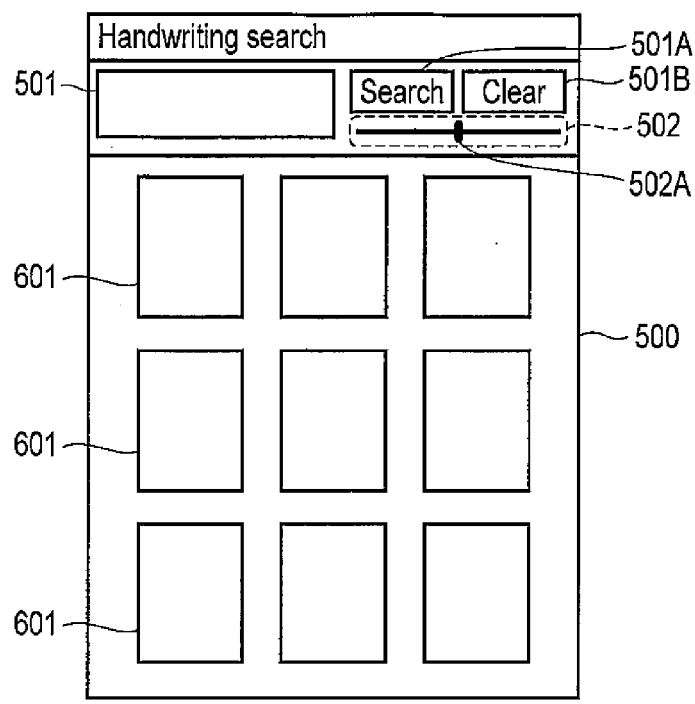
FIG. 8 is an exemplary diagram showing a search screen.

FIG. 8 shows an example of a handwriting search screen 500 displayed for the user by the digital notebook application program 202.

The handwriting search screen 500 displays a search key input area 501, a search button 501A, a clear button 501B, and a slider bar 502. The search key input area 501 is an input area for handwriting a character string or a figure to be searched for. The search button 501A is a button for specifying the execution of a handwriting search process. The clear button 501B is a button for specifying the deletion (or clearance) of a character string or a figure handwritten in the search key input area 501. A reference value in a handwriting search process can be adjusted by sliding the button 502A in the slider bar 502 right and left.

The handwriting search screen 500 further displays one or more handwritten thumbnails 601. In the example of FIG. 8, nine handwritten thumbnails 601 corresponding to nine handwritten pages respectively are displayed.

Figure 9:
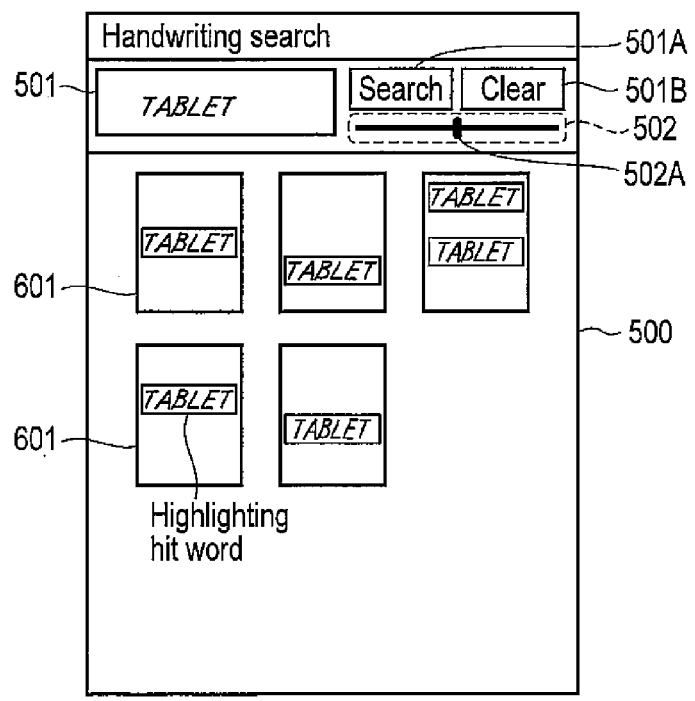
FIG. 9 is an exemplary diagram showing a search result.

As shown in FIG. 9, when the search button 501A is pressed, with the handwritten letter string "TABLET" input to the search key input area 501, a handwriting search process for searching each of the nine handwritten pages for the handwritten letter string "TABLET" is started. Then, on the handwriting search screen 500, handwritten page thumbnails corresponding to several handwritten pages including the handwritten letter string "TABLET" are displayed. FIG. 9 shows a case where five of the nine handwritten pages have been retrieved as handwritten pages including the handwritten letter string "TABLET". The hit word, that is, the handwritten letter string "TABLET" in the five handwritten page thumbnails is highlighted so as to be distinguished from the remaining handwritten part.

In the state shown in FIG. 9, for example, when the button 502A has been slid to decrease the reference value, a search result display screen shown in FIG. 10 is displayed. As a result of decreasing the reference value, six of the nine handwritten pages are retrieved as handwritten pages including the handwritten letter string "TABLET".

In the state shown in FIG. 9, for example, when the button 502A has been slid to increase the reference value, a search result display screen shown in FIG. 11 is displayed. As a result of increasing the reference value, five of the nine handwritten pages are retrieved as handwritten pages including the handwritten letter string "TABLET".

Figure 12:
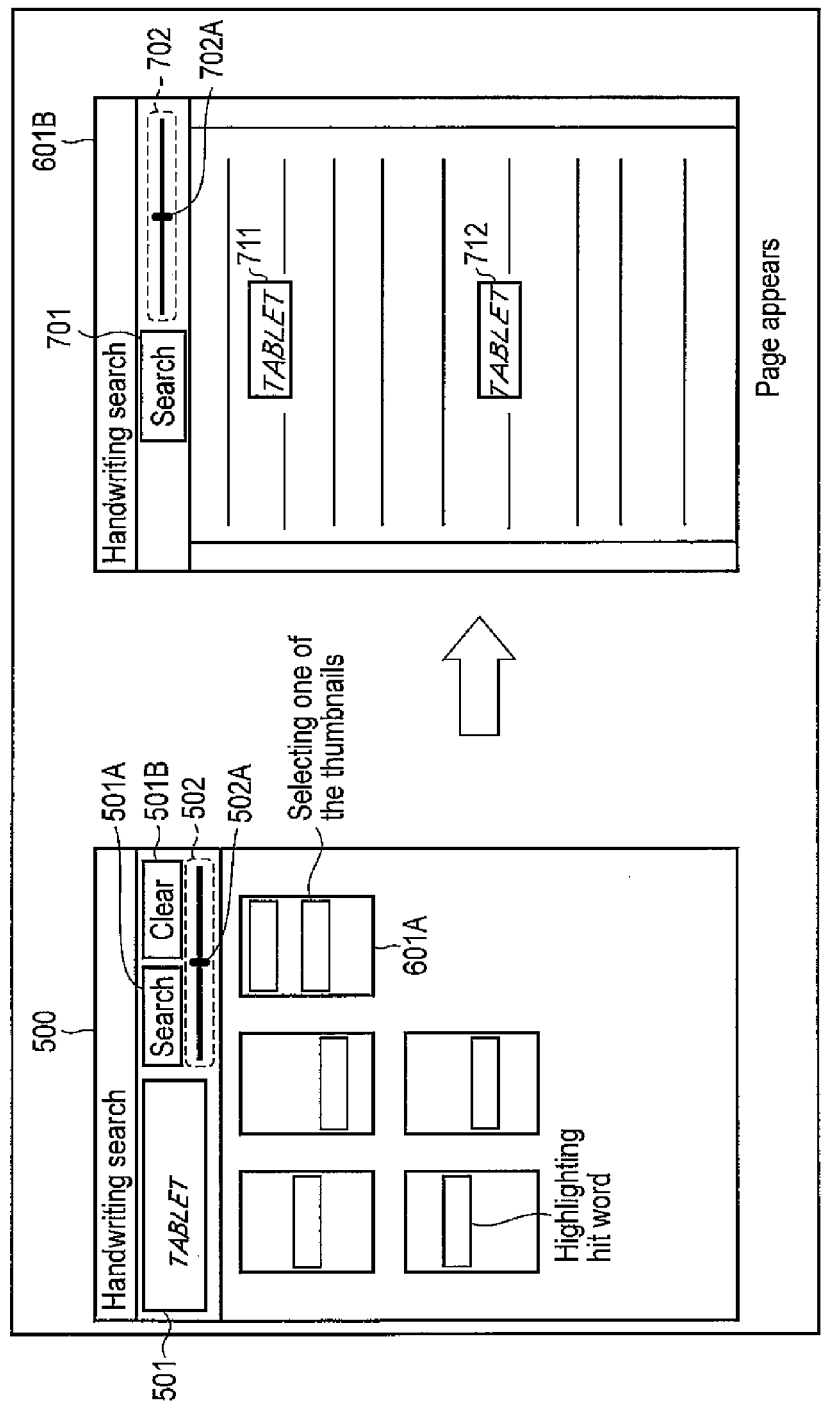
FIG. 12 is an exemplary diagram showing the way a jump is made from the search screen of FIG. 8 to a certain page.

One of the five retrieved handwritten page thumbnails has been selected by the user, a handwritten page 601B corresponding to a selected a handwritten page thumbnail 601A is displayed in a normal size on the screen as shown in FIG. 12. On the handwritten page 601B, a search button 700 is displayed. When the user has pressed the search button 700, the contents of the display screen are returned to a search screen shown on the left side of FIG. 11. On the handwritten page 601B, a slider bar is further displayed as a user interface for adjusting a reference value in a handwriting search process. The reference value in the handwriting search process can be adjusted in a set range by laterally sliding the button 701A in the slider bar 701.

In the handwritten page 601B of FIG. 12, handwritten letter strings "TABLET" 711, 712 are highlighted. In the state shown in FIG. 12, for example, when the button 502A has been slid to decrease the reference value, a search result display screen shown in FIG. 13 is displayed. As a result of decreasing the reference value, a handwritten page 601B is displayed. In the handwritten page 601B, handwritten letter strings "TABLET" 711 to 713 are highlighted. In the state shown in FIG. 12, for example, when the button 502A has been slid to increase the reference value, a search result display screen shown in FIG. 14 is displayed. As a result of increasing the reference value, a handwritten page 601C is displayed. In the handwritten page 601C, a handwritten letter string "TABLET" 711 is highlighted.

Figure 15:
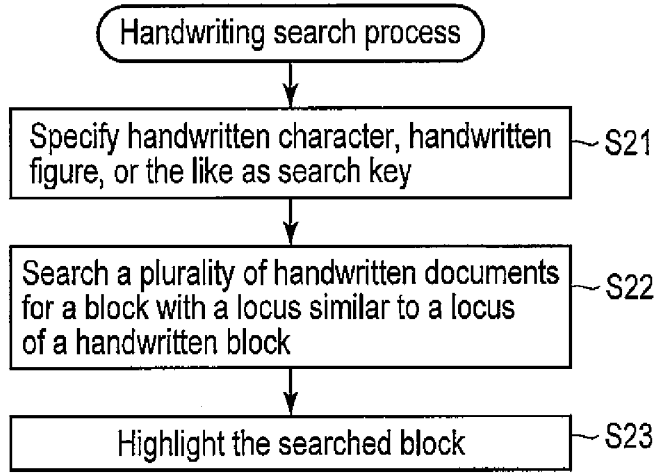
FIG. 15 is an exemplary flowchart to explain the procedure for a search process of the embodiment.

Next, the procedure for the handwriting search process will be explained with reference to a flowchart in FIG. 15. According to a user operation, the digital notebook application program 202 specifies a handwritten block (time-series information part), that is, a handwritten character string, a handwritten figure, or the like, as a search key (search query) (block S31). Then, the digital notebook application program 202 searches a plurality of handwritten documents (handwritten pages) for a handwritten block that has a locus of a stroke whose degree of the similarity with a locus of a stroke in the handwritten block specified as the search key is greater than or equal to a reference value (block S32). The searched handwritten block is highlighted (block S33).

Figure 16:
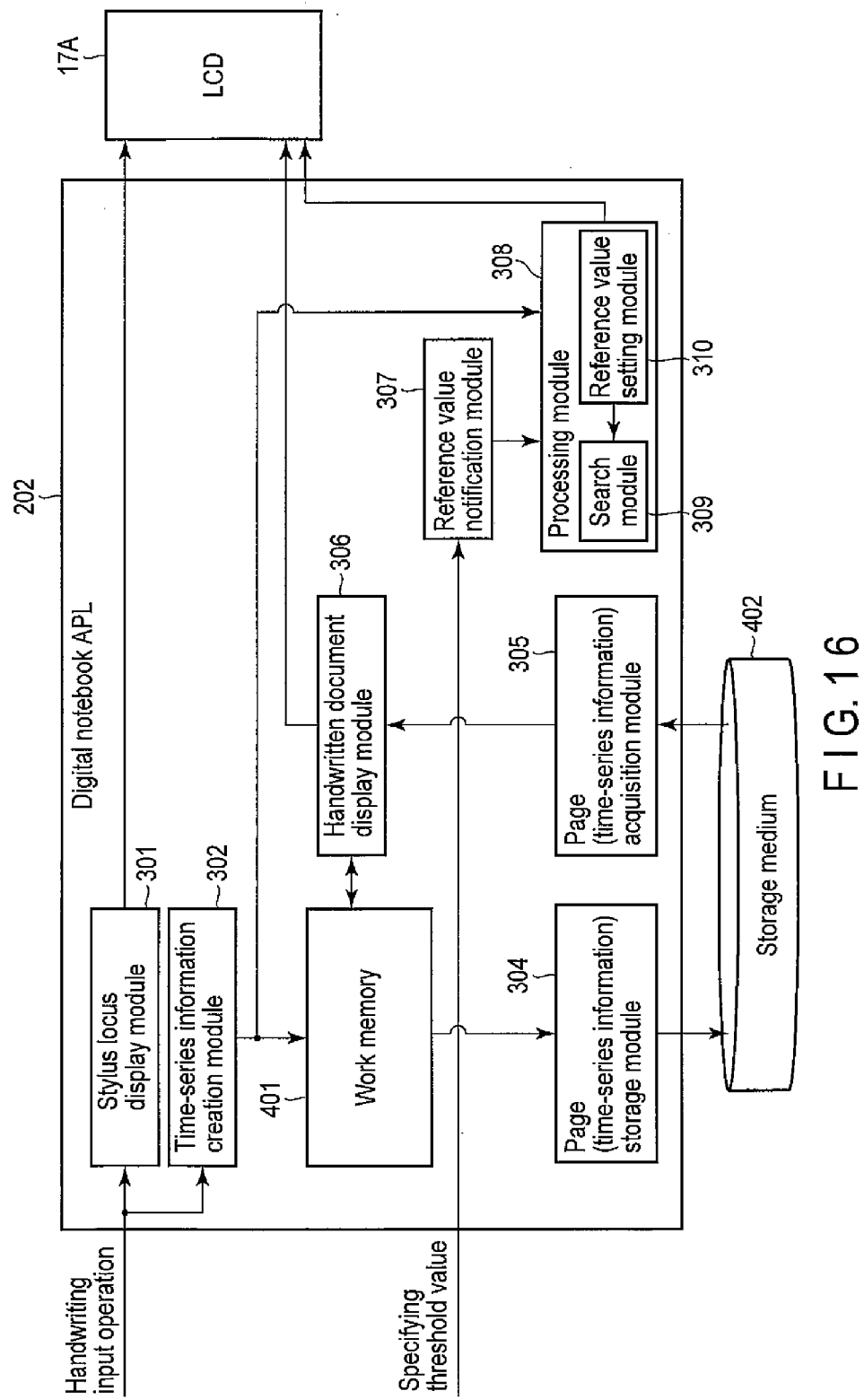
FIG. 16 is an exemplary diagram showing a modification of the functional configuration of the digital notebook application program 202.

FIG. 16 shows a modification of the functional configuration of the digital notebook application program 202.

A reference value setting module 310 sets a reference value in the search module 309 according to the number of strokes of a character string or a figure handwritten in the search key input area 501 of the handwriting search screen 500. For example, the reference value may be decreased each time the number of strokes increases. As the number of strokes increases, the number of character strings or figures to be retrieved decreases. When the reference value is decreased each time the number of strokes increases, this suppresses a decrease in the number of character strings or figures to be retrieved.

FIG. 17 shows a modification of the functional configuration of the digital notebook application program 202.

A recognition module 311 subjects currently displayed time-series information (handwritten page) and a character string or a figure handwritten in the search key input area 501 to recognition processing, such as handwritten character recognition, handwritten figure recognition, or handwritten table recognition.

A reference value setting module 312 retrieves a search key from time-series information (handwritten page) on the basis of the result of recognizing currently displayed time-series information (handwritten page) at the recognition module 311 and the result of recognizing a character string or a figure handwritten in the search key input area 501. The reference value setting module 312 sets a suitable reference value in the search module 309 on the basis of the search result using the recognition result and the handwriting search result at the search module 309. The reference value setting module 312 sets a reference value so that the search result using the recognition result may coincide with the handwriting search result at the search module 309. For example, when the handwriting search result at the search module 309 has proved that more parts have been retrieved than the search result using the recognition result, the reference value is set higher than the present setting value. For example, the handwriting search result at the search module 309 has proved that fewer parts have been retrieved than the search result using the recognition result, the reference value is set lower than the present setting value.

The process performed by the recognition module 311 and reference value setting module 312 need not be carried out each time. This is effective when time-series information (handwritten page) input by another user is subjected to a handwriting search process.

Figure 18:
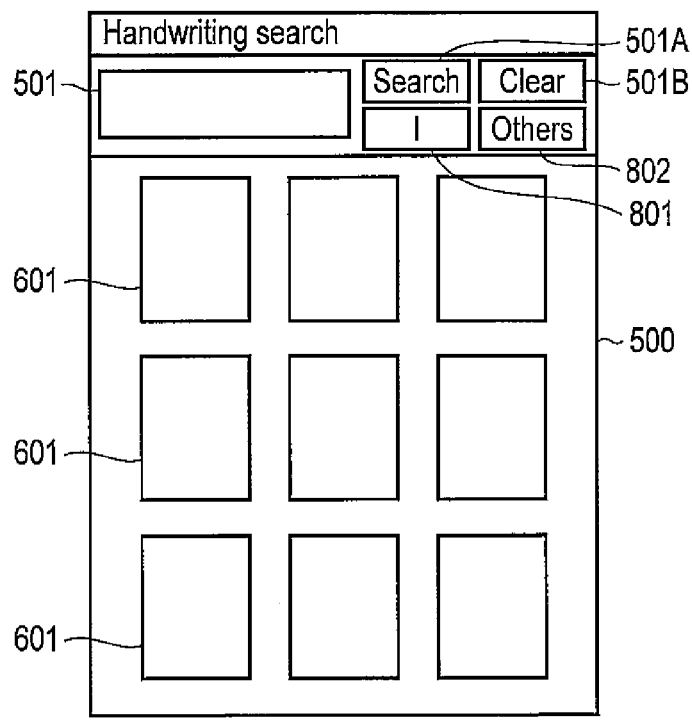
FIG. 18 is an exemplary diagram showing a search screen.

FIG. 18 shows a search screen displayed by an electronic device.

When time-series information (handwritten page) input by another person is subjected to handwriting search, handwriting is difficult to retrieve unless the reference value is decreased because handwriting differs. Therefore, as a user interface for changing a reference value, an I button 801 and an Others button 802 may be displayed as shown in FIG. 18. A reference value when the Others button 802 has been operated is set lower than a reference value when the I button 801 has been operated.

In addition, when time-series information (handwritten page) stored in the server 2 is acquired and the acquired handwritten page is subjected to a handwriting search process, a reference value when the Others button 802 has been operated may be set automatically. The chances are high that a handwritten page stored in the server 2 is a handwritten page created by another user. Therefore, use of a reference value when the Others button 802 has been operated makes it possible to retrieve the intended handwriting information part.

As described above, with the embodiment, a user interface for changing a reference value in a handwriting search process is displayed on the display screen of the touchscreen display 17. This enables the user to change the reference value using the user interface. Therefore, it is possible not only to retrieve the intended handwriting information part from a handwritten page but also to prevent an unintended handwriting information part from being retrieved from the handwritten page in a handwriting search process.

The handwriting search process and recognition process (character recognition process, figure recognition process, table recognition process) may be performed by the personal computer 1 or the server 2 on the Internet in cooperation with the tablet computer 10.

Since various processes performed on a handwritten document in the embodiment can be realized by computer programs, the same effect as that of the embodiment can be realized easily by just installing the computer programs into a normal computer with a touchscreen display via a computer-readable storage medium in which the computer programs have been stored.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    an input configured to receive stroke data corresponding to a search key; and
    a processor configured to display, simultaneously on a screen, a plurality of first thumbnails corresponding to a plurality of first pages of a handwriting document, and a first user interface for changing a reference value, each of the first pages comprising a first part comprising a stroke whose degree of a similarity with a stroke corresponding to the search key is greater than the reference value,
    wherein the processor, if the reference value is changed by the first user interface, is configured to display a plurality of second thumbnails corresponding to second pages of a handwriting document, each of the second pages comprising a second part comprising a stroke whose degree of a similarity with a stroke corresponding to the search key is greater than or equal to a changed reference value,
    a number of the plurality of first thumbnails and a number of the plurality of second thumbnails can be different in accordance with the reference value and the changed reference value,
    the processor is configured to distinguishably display a part corresponding to the first part and a part not corresponding to the first part of the plurality of first thumbnails on the screen, and
    the processor is configured to distinguishably display a part corresponding to the second part and a part not corresponding to the second part of the plurality of second thumbnails on the screen.

2. The device of claim 1, wherein the display processor is configured to display, on the screen, a plurality of strokes based on a handwriting document corresponding to a thumbnail selected from the plurality of first thumbnails or the plurality of second thumbnails.

3. The device of claim 1, wherein the processor is configured to further display, simultaneously on the screen, the second thumbnails and a second user interface for changing the reference value, and
    the processor, if the reference value is changed again by the second user interface, is configured to display a plurality of third thumbnails corresponding to third pages of the handwriting document, each of the third pages comprising a third part comprising a stroke whose degree of the similarity with a stroke corresponding to the search key is greater than or equal to the reference value changed again.

4. The device of claim 3, wherein the display processor is configured to distinguishably display the third part and another part of the third pages.

5. The device of claim 1, wherein the display processor is configured to:
    display, on the screen, a search key input area in which a character string or a figure to be searched for is to be handwritten, and
    use a character string or a figure handwritten in the search key input area as the search key.

6. The device of claim 5, wherein the processor is configured to detect a number of strokes of a character string or a figure handwritten in the search key input area and to set a reference value based on the number of strokes.

7. A method comprising:
    displaying, simultaneously on a screen, a plurality of first thumbnails corresponding to a plurality of first pages of a handwriting document, and a first user interface for changing a reference value, each of the first pages comprising a first part comprising a stroke whose degree of a similarity with a stroke corresponding to a search key is greater than or equal to the reference value; and
    displaying, if the reference value is changed by the first user interface, a plurality of second thumbnails corresponding to second pages of a handwriting document, each of the second pages comprising a second part comprising a stroke whose degree of a similarity with a stroke corresponding to the search key is greater than or equal to the changed reference value,
    wherein the method is performed by a processor comprising computer hardware,
    a number of the plurality of first thumbnails and a number of the plurality of second thumbnails can be different in accordance with the reference value and the changed reference value,
    a part corresponding to the first part and a part not corresponding to the first part of the plurality of first thumbnails are distinguishably displayed on the screen, and
    a part corresponding to the second part and a part not corresponding to the second part of the plurality of second thumbnails are distinguishably displayed on the screen.

8. The method of claim 7, further comprising displaying, on the screen, a plurality of strokes based on a handwriting document corresponding to a thumbnail selected from the plurality of first thumbnails or the plurality of second thumbnails.

9. The method of claim 8, further comprising:
displaying, simultaneously on the screen, the second thumbnails and a second user interface for changing the reference value, and
displaying, if the reference value is changed again by the second user interface, a plurality of third thumbnails corresponding to third pages of the handwriting document, each of the third pages comprising a third part comprising a stroke whose degree of the similarity with a stroke corresponding to the search key is greater than or equal to the reference value changed again.

10. The method of claim 9, further comprising distinguishably displaying the third part and another part of the third pages.

11. The method of claim 7, further comprising:
displaying, on the screen, a search key input area in which a character string or a figure to be searched for is to be handwritten; and
using a character string or a figure handwritten in the search key input area as the search key.

12. The method of claim 11, further comprising:
detecting a number of strokes of a character string or a figure handwritten in the search key input area; and
setting a reference value based on the number of strokes.

13. A non-transitory computer-readable storage medium storing computer-executable instructions that, if executed, cause a computer to:
display, simultaneously on a screen, a plurality of first thumbnails corresponding to a plurality of first pages of a handwriting document, and a first user interface for changing a reference value, each of the first pages comprising a first part comprising a stroke whose degree of a similarity with a stroke corresponding to a search key is greater than or equal to the reference value; and
display, if the reference value is changed by the first user interface, a plurality of second thumbnails corresponding to second pages of a handwriting document, each of the second pages comprising a second part comprising a stroke whose degree of a similarity with a stroke corresponding to the search key is greater than or equal to the changed reference value,
wherein a number of the plurality of first thumbnails and a number of the plurality of second thumbnails can be different in accordance with the reference value and the changed reference value,
a part corresponding to the first part and a part not corresponding to the first part of the plurality of first thumbnails are distinguishably displayed on the screen, and
a part corresponding to the second part and a part not corresponding to the second part of the plurality of second thumbnails are distinguishably displayed on the screen.

14. The medium of claim 13, wherein the computer-executable instructions further cause the computer to display, on the screen, a plurality of strokes based on a handwriting document corresponding to a thumbnail selected from the plurality of first thumbnails or the plurality of second thumbnails.

15. The medium of claim 14, wherein the computer-executable instructions further cause the computer to:
display, simultaneously on the screen, the second thumbnails and a second user interface for changing the reference value, and
display, if the reference value is changed again by the second user interface, a plurality of third thumbnails corresponding to third pages of the handwriting document, each of the third pages comprising a third part comprising a stroke whose degree of the similarity with a stroke corresponding to the search key is greater than or equal to the reference value changed again.

16. The medium of claim 15, wherein the computer-executable instructions further cause the computer to distinguishably display the third part and another part of the third pages.

17. The medium of claim 13, wherein the computer-executable instructions further cause the computer to:
display, on the screen, a search key input area in which a character string or a figure to be searched for is to be handwritten; and
use a character string or a figure handwritten in the search key input area as the search key.

18. The medium of claim 17, wherein the computer-executable instructions further cause the computer to:
detect a number of strokes of a character string or a figure handwritten in the search key input area; and
set a reference value based on the number of strokes.

* * * * *